United States Patent

Maingaud et al.

[11] Patent Number: 5,826,690
[45] Date of Patent: Oct. 27, 1998

[54] PROCESS FOR THE ASSEMBLY OF A LOCKING CLUTCH FOR A HYDROKINETIC COUPLING DEVICE, ESPECIALLY FOR A MOTOR VEHICLE, A CORRESPONDING LOCKING CLUTCH AND A HYDROKINETIC COUPLING DEVICE COMPRISING SUCH A LOCKING CLUTCH

[75] Inventors: Daniel Maingaud, Le Plessis Bouchard; Rabah Arhab, St Brice Sous Foret, both of France

[73] Assignee: Valeo, Paris Cedex, France

[21] Appl. No.: 649,726

[22] PCT Filed: Nov. 3, 1995

[86] PCT No.: PCT/FR95/01442

§ 371 Date: Oct. 15, 1996

§ 102(e) Date: Oct. 15, 1996

[87] PCT Pub. No.: WO96/14526

PCT Pub. Date: May 17, 1996

[30] Foreign Application Priority Data

Nov. 4, 1994 [FR] France ................................ 94 13205

[51] Int. Cl.⁶ .............................. F16H 45/02; F16D 13/68
[52] U.S. Cl. .................. 192/70.18; 192/3.29; 29/525.03; 29/525.05
[58] Field of Search .................................. 192/3.28, 3.29, 192/70.18, 70.28, 200; 29/525.03, 525.05

[56] References Cited

U.S. PATENT DOCUMENTS

| | | |
|---|---|---|
| 2,493,700 | 1/1950 | Spase . |
| 2,694,478 | 11/1954 | Zeidler ................................. 192/70.18 |
| 4,353,444 | 10/1982 | Bionaz .................................. 192/3.29 |
| 4,519,736 | 5/1985 | Sigmund . |
| 5,613,582 | 3/1997 | Jackel .................................... 192/3.29 |

FOREIGN PATENT DOCUMENTS

| | | |
|---|---|---|
| 075 387 | 3/1983 | European Pat. Off. . |
| 195 274 | 9/1985 | European Pat. Off. . |
| 1051483 | 1/1954 | France . |
| 1203823 | 1/1960 | France . |
| 2282563 | 3/1976 | France . |
| 2634849 | 10/1991 | France . |
| 2695975 | 3/1994 | France . |
| 2702262 | 9/1994 | France . |
| 26 05 623 | 8/1976 | Germany . |
| 2 123 101 | 1/1984 | United Kingdom . |

OTHER PUBLICATIONS

International Search Report dated Sep. 1, 1996.

*Primary Examiner*—Richard M. Lorence
*Attorney, Agent, or Firm*—Morgan & Finnegan, L.L.P.

[57] ABSTRACT

A locking clutch has a piston which is movably mounted axially in relation to a fixed wall and rotationally connected to the wall by tongues. For coupling the tongues to the piston, an attachment has a first portion, which is fixed to the side of the tongues that is opposite to the piston, and a second portion, which to engage the first portion, only requires attachment action on the side of the piston.

13 Claims, 4 Drawing Sheets

PROCESS FOR THE ASSEMBLY OF A LOCKING CLUTCH FOR A HYDROKINETIC COUPLING DEVICE, ESPECIALLY FOR A MOTOR VEHICLE, A CORRESPONDING LOCKING CLUTCH AND A HYDROKINETIC COUPLING DEVICE COMPRISING SUCH A LOCKING CLUTCH

Priority is claimed from French patent application Ser. No. 94/13205 filed Nov. 4, 1994.

The invention relates to hydrokinetic coupling devices, especially for motor vehicles, equipped with a locking clutch, commonly known as a "lock-up" clutch, to mechanically connect the turbine wheel to the impeller wheel for rotation, and the like.

It more particularly relates to the case in which this locking clutch comprises at least one friction lining,. The friction bearing, being rotationally attached to the turbine wheel, either directly or by means of a torsion damping device, is disposed axially between, firstly, a fixed wall, i.e. a wall fixed in relation to the impeller wheel, and thus, fixed in relation to the case of the assembly, and on the other hand, a piston, which, mounted movably axially in relation to the fixed wall, is rotationally attached thereto by tongues which are substantially extended tangentially at a circumference of the assembly.

This is the case, for example, in the documents FR-A-1 051 483 and 1 203 823, in which however the locking clutch acts between a fixed wall and a separate driven shaft thereof on which the turbine wheel is locked.

One of the problems in the assembly of a locking clutch of this type involves the coupling to be provided between the tongues and the piston.

This problem more precisely relates to the fact that this coupling usually uses attachment means which require them to be acted on from both sides of the piston.

This is the case in documents FR-A-1 051 483 and 1 203 823, in which, however, the tongues couple the piston not to the fixed wall against which it has to press the friction lining or linings, but to another fixed wall, which, parallel to the preceding one, is duly rotationally connected therewith.

In such a case, the locking clutch uses several separate fixed walls, on which it is possible to act individually, and the coupling of the tongues to the piston does not give rise to any particular problem, as moreover this coupling is in practice performed at the very periphery of this piston, on lugs radially extending the piston for this purpose.

However as a result the construction for the assembly is relatively complicated and there is a notable increase in the axial spatial requirement, with the friction lining or linings acting in practice on the outside of the hydraulic chamber confined by the piston, on the side thereof opposite the fixed wall which delimits this hydraulic chamber.

The difficulties in actual fact occur when the friction lining or linings act at the periphery of the hydraulic chamber, and when, in addition, the corresponding fixed wall, which is the only one concerned, is a case wall, and, more precisely the base wall of a bell-shaped case shell inside which one or more of the friction linings and the piston extend.

This is the case, for example, in documents FR-A-2 634 849 and 2 702 262.

In these documents, various expedients are used to provide the rotational attachment of the piston to the fixed wall, which when they make tongues act, also make an additional disc act, which with these tongues and the piston forms a sub-assembly on which it is possible to act individually before performing its assembly in the case shell is to be so equipped.

In document FR-A-2 634 849, this additional disc acts inside the hydraulic chamber formed by the piston and the fixed wall, and, for its rotational attachment to the wall, it is necessary to provide a splined assembly between it and a hub borne axially by this fixed wall.

In document FR-A-2 702 262, the additional disc acts outside the hydraulic chamber formed by the piston and the fixed wall, and, for its rotational attachment to the wall, it is necessary to lock it onto the corresponding hub, by applying an appropriate deformation to the hub.

In both cases, as above, the result is a certain complication of design and of assembly.

The objects of the invention are a method for assembly which allows these drawbacks to be avoided, the locking clutch used for the application of this method, and the hydrokinetic coupling device comprising such a locking clutch.

According to the invention, for the coupling of the tongues to the piston in a locking clutch of the type in question, attachment means are used which, whilst being capable, in a manner known per se, of generally passing through the tongues and the piston, comprise two portions, namely a first portion, which, according to the invention, is fixed in advance to the tongues, on the side thereof opposite the piston, and a second portion which, to come into engagement with the first portion, only requires action on the side of the piston.

It is thus advantageously possible, with a minimum of components, to proceed blind with the assembly to be performed, by a simple stacking of these components in a same axial direction, by performing first an engagement of the piston on the first portion of the attachment means borne by the tongues, then by very simply performing the positioning of the second portion of the means. The subject matters of the invention, their characteristics and their advantages will moreover become apparent from the following description, by way of example, with reference to the attached diagrammatical drawings on which:

Figure 2:
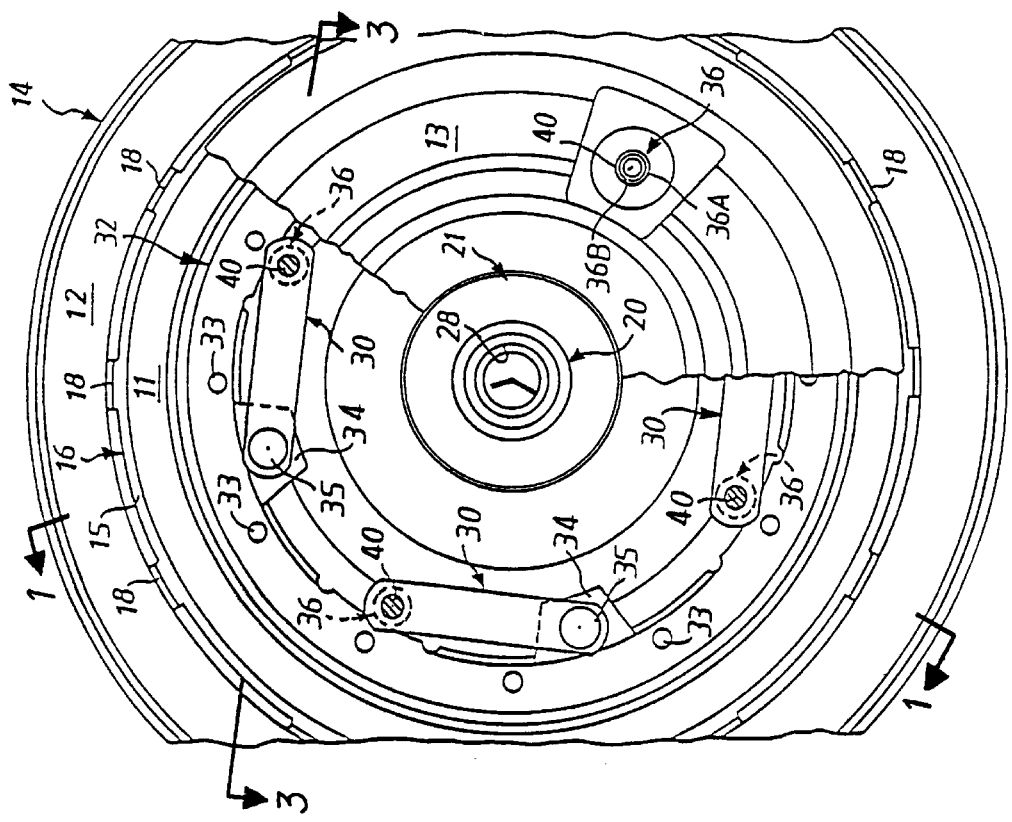
FIG. 2 is, with a locally cut-away portion, a partial front view along arrow II of FIG. 1.
Figure 1:
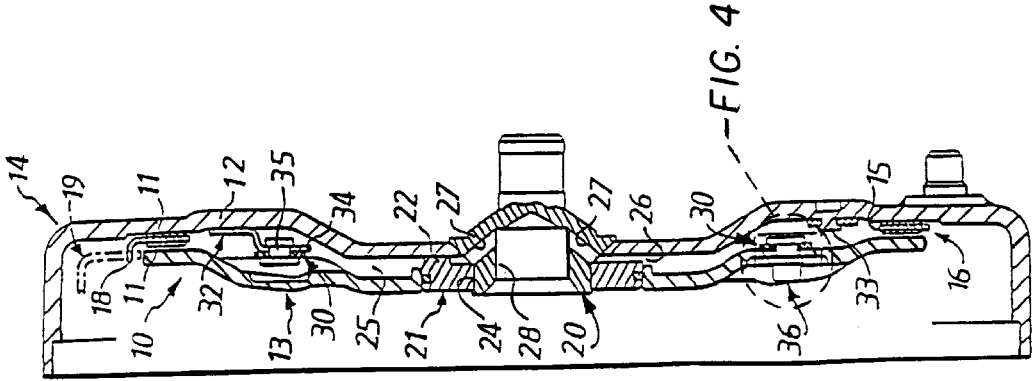
FIG. 1 is an axial sectional view of a locking clutch according to the invention, along the broken line I—I of FIG. 2.
Figure 3:
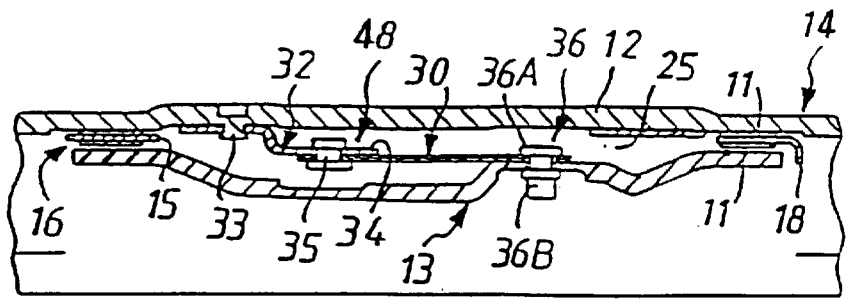
FIG. 3 is a partial cross-sectional view along line III—III of FIG. 2.
Figure 4:
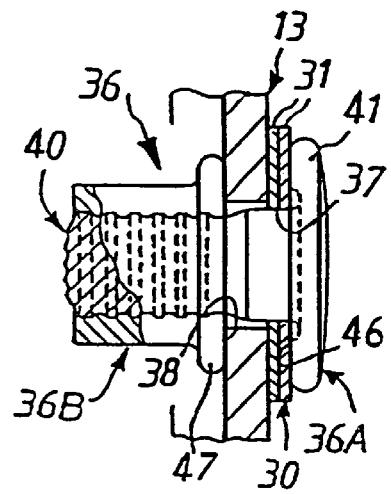
Figure 5:
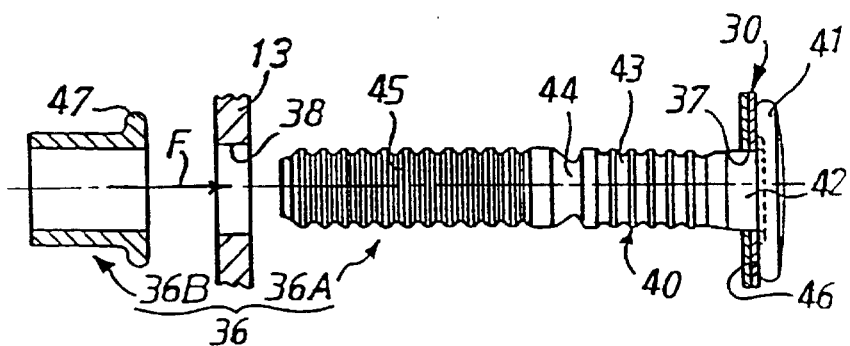
Figure 7:
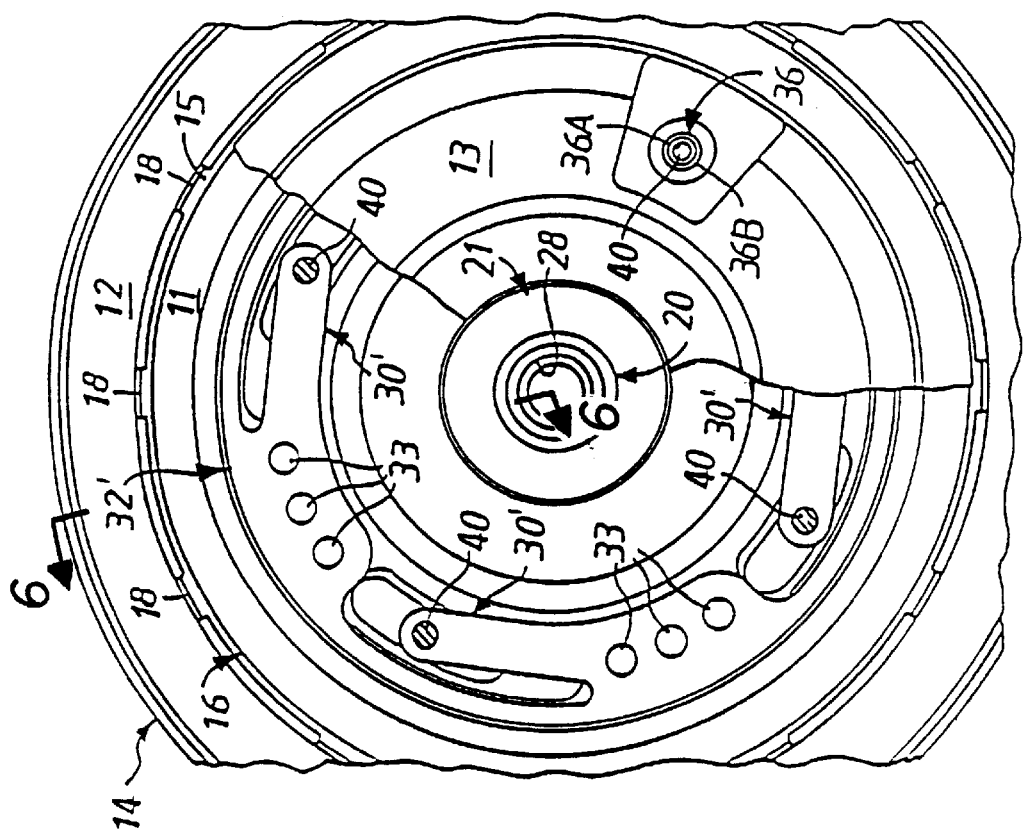
Figure 6:
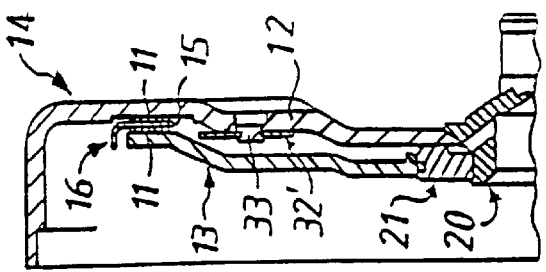
Figure 9:
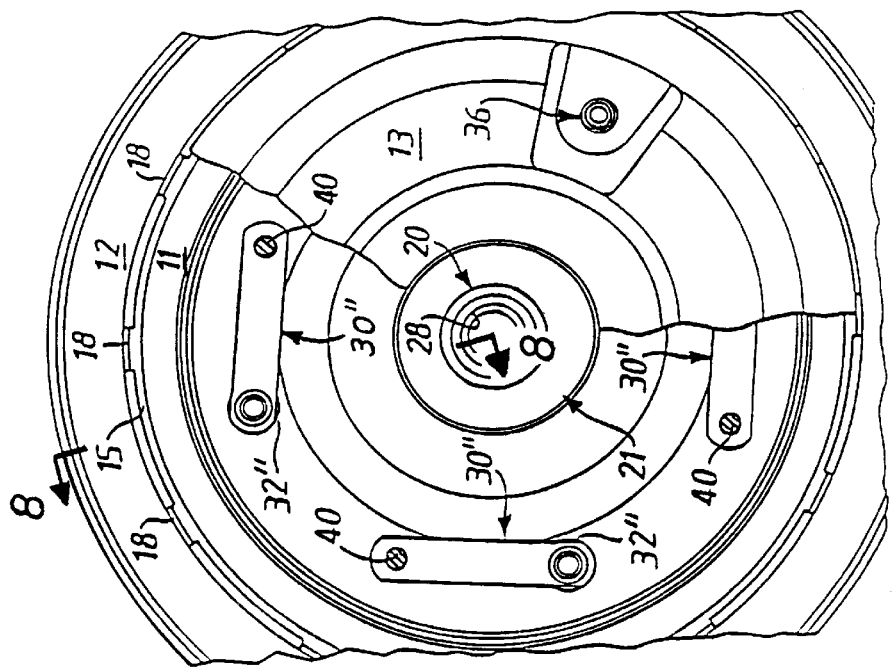
Figure 8:
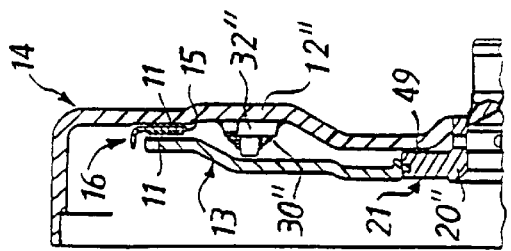
Figure 10:
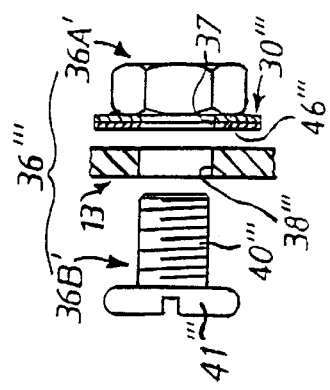

FIG. 4 reproduces, on a larger scale, the detail of FIG. 1 marked by an inset IV on FIG. 1;

FIG. 5 is an exploded view which, derived from that of FIG. 4, illustrates the utilisation of the invention;

FIGS. 6, 7 are views, each corresponding respectively with those of FIGS. 1 and 2, which relate to a first variant;

FIGS. 8 and 9 are views which are similar to those of FIGS. 6 and 7 and relate to a second variant;

FIG. 10 is a view which, similar to that of FIG. 5, relates to another variant.

As illustrated on these figures, it generally concerns the assembly of a locking clutch 10 which is intended to equip a hydrokinetic coupling device, not represented, to enable the turbine wheel of this hydrokinetic coupling device to be mechanically attached, directly or indirectly, during rotation to its impeller. The locking clutch 10 comprises at least one friction lining 11 disposed axially between a fixed wall 12 and a piston 13 mounted for axial movement in relation to this fixed wall whilst being rotationally connected therewith.

By fixed wall 12 here an axially fixed wall is simply understood.

However it is obvious that this fixed wall 12 is rotationally driven around the axis of the assembly. Here, the fixed wall 12 is a case wall, and more precisely it relates to the base wall of a bell-shaped case 14, in which the impeller of the hydrokinetic coupling device is rotationally connected, and inside which the friction lining or linings 11 and the piston 13 extend.

Here two friction linings 11 are provided, which are each disposed respectively on either side of a support washer 15, by being duly fixed thereto, for example by bonding, and with this support washer 15 form a driven plate assembly 16.

From place to place on its outer periphery the support washer 15 has axially directed lugs 18 which, by extending radially beyond the outer periphery of the piston 13, are intended, as shown by broken lines on FIG. 1, to connect the driven plate assembly 16 rotationally to one of the components of a torsion damping device 19, the other component of which is itself rotationally connected to the turbine wheel of the hydrokinetic coupling device.

Here the fixed wall 12 axially bears a centering pivot 20 protruding into its central zone, and this centering pivot 20 itself annularly bears a ring 21, which is locked axially in relation thereto, and on which the piston 13 is tightly slidingly mounted by its inner periphery.

On FIGS. 1 to 5, the ring 21, which is separate from the centering pivot 20, directly abuts against the fixed wall 12, by having bosses 22 from place to place for this purpose, and, engaged on a bearing surface 24 of the centering pivot 20, it is axially locked thereon on the side opposite the fixed wall 12, for example, and as represented, by a pushing back of material of the corresponding end of the centering pivot 20 resulting in a clinching thereof on the other side of this ring 21.

The fixed wall 12 and the piston 13 jointly define, with the ring 21, a hydraulic chamber 25, on the outer periphery of which the friction linings 11 act, and which, by the passages 26 coming radially between the bosses 22 of the ring 21, bores 27 provided for this purpose in the centering pivot 20 and the axial bore 28 thereof, is able to be brought into communication with a pressurised fluid source (not represented).

In a manner known per se, the piston 13 is rotationally connected to the fixed wall 12 by tongues 30, which, substantially extended tangentially on a same circumference of the assembly, are resiliently deformable axially, to allow the piston 13 all the necessary axial mobility in relation to this fixed wall 12.

For the sake of simplicity, here by tongues is understood either tongues acting individually or tongues resulting from a stacking of elementary tongues.

Here four tongues 30 are provided, by being regularly distributed in a circle around the axis of the assembly.

On FIGS. 1 to 5, each of the tongues 30 is formed by a stacking of two elementary tongues 31.

Here the tongues 30 act in the hydraulic chamber 25 by being disposed in the volume which extends radially between the friction linings 11 and the axis of the assembly.

They are coupled, either directly or indirectly, to the fixed wall 12 at one of their ends, and to the piston 13 at the other of the said ends.

On FIGS. 1 to 5, they are coupled to the fixed wall 12 by means of a part 32 fixed thereto.

In practice, this part 32 is a washer which, common to the assembly of the tongues 30, is fixed to the fixed wall 12 by rivets 33 here formed in a single piece therefrom, for example by extrusion, and which has, from place to place, on its inner periphery, being offset axially in relation to its usual, or main portion, lugs 34 to which the tongues 30 are attached by rivets 35.

According to the invention, for the coupling of the tongues 30 to the piston 13, attachment means 36 are used, which whilst being capable, in a manner known per se, of generally passing through the tongues 30, by means of a bore 37 thereof, and the piston 13, by means of bores 38 thereof, generally comprise two portions, namely a first portion 36A which, in advance, and according to the arrangements described in further detail below, is attached to the tongues 30, on the side thereof opposite the piston 13, and a second portion 36B, which, to come into engagement with the first portion 36A, only requires action on the side of the piston 13.

In other words, according to the invention, the first portion 36A of the attachment means 36 is fixed to the tongues 30 independently of their second portion 36B.

On FIGS. 1 to 5, the attachment means 36 associated with a tongue 30 are formed by an attachment of the clinched bolt rod type.

Their first portion 36A comprises a rod 40 and a head 41.

Here the rod 40 advantageously loosely passes through the bore 38 of the piston 13.

From the head 41, the rod 40 successively comprises a smooth section 42, a first indexed section 43, and, beyond a zone of predetermined lesser resistance or reduced strength 44, a second indexed section 45.

Here, the head 41 forms, at its connection with the rod 40, a plane bearing surface 46 by which it is able to be applied to the associated tongue 30 around the corresponding bore 37 thereof.

The first portion 36A, formed in this manner, of the attachment means 36 may for example be attached to the tongue 30 by the forced engagement of the smooth section 42 of its rod 40 in the bore 37 of this tongue 30.

To promote this forced engagement, the smooth section 42 of the rod 40 is here slightly tapered.

As a variant, or in combination, it may be knurled if desired. As a variant, also, the first portion 36A of the attachment means 36 may also be attached to the tongue 30 by adhering the bearing surface 46 of its head 41 to this tongue 30, for example by welding or bonding.

The second portion 36B of the attachment means 36 is jointly formed by a simple ring intended to be clinched on the first indexed section 43 of the rod 40 of the first portion 36A.

Here this ring comprises, on the side of the piston 13, a shoulder 47, having a larger diameter, to avoid its creepage into the bore 38 of this piston 13.

For mounting the procedure may be as follows.

First of all one proceeds with the coupling of the tongues 30 to the fixed wall 12.

For this purpose, one proceeds to form a sub-assembly 48 comprising the part 32, the tongues 30 attached by rivets 35 to the lugs 34 of this part 32, and, borne by these tongues 30, the first portion 36A of the attachment means 36, as represented on FIG. 5.

This sub-assembly 48 is then attached to the fixed wall 12, by the rivets 33.

Then one provides an engagement of the piston 13 by its bores 38 on the first portion 36A of the attachment means 36 borne by the tongues 30, as shown by the arrow F on FIG. 5.

This engagement of the piston 13 on the first portion 36A of the attachment means 36 is preferentially performed with a joint centering of this piston 13 in relation to the fixed wall 12.

For example, for this purpose use is made of the centering pivot 20, by using a center punch (not represented), which, firstly, bears internally on this centering pivot 20 and, secondly, bears externally on the part 32, and more precisely, on the inner periphery of the lugs 34 which the part has.

Thanks to the centering provided in this manner, the piston 13, which finds its position by the clearance occurring between its bores 38 and the rod 40 of the first portion 36A of the attachment means 36, advantageously does not interfere with the ring 21, but on the contrary correctly engages slidingly thereon.

Finally it is sufficient to provide the positioning of the second portion 36B of the attachment means 36, in other words to engage the ring forming this second portion 36B on the rod 40 of the first portion 36A, as shown by the arrow F on FIG. 5, until it abuts against the piston 13.

By means of a special tool, one then proceeds to exert traction on the rod 40 of the first portion 36A of the attachment means 36, in order to clamp the tongue 30 and the piston 13 between the head 41 of this first portion 36A and the ring forming the second portion 36B, then to radially clamp this second portion 36B on the first indexed section 43 of the rod 40 of the first portion 36A, for its clinching on this first indexed section 43.

As the traction on the rod 40 of the first portion 36A has now been performed, one finally proceeds with the detachment of the second indexed section 45 from the rod 40 of the first portion 36A, by breaking this rod 40 at its zone of predetermined lesser resistance or reduced strength.

As will be noted, by virtue of the offsetting of the lugs 34 of the part 32, the fixed wall 12 may, if desired, be substantially plane, at least in the attachment As already i part 32.

As already indicated above, the ring forming the second portion 36B of the attachment means 36 is furthermore prevented from creeping into the bores 38 of the piston 13 by its shoulder 47.

On FIGS. 6, 7, the tongues 30' are in a single piece with the washer forming the part 32' by means of which they are coupled to the fixed wall.

In such a case, the tongues 30' each act separately.

On FIGS. 8, 9 the tongues 30" are coupled to the fixed wall 12" by means of an individual part 32".

Here a boss attached locally by welding to the fixed wall 12" is involved.

As a variant, this boss may be in a single piece with the fixed wall 12", for example by stamping the wall.

Here the ring 21 is moreover in a single piece with the centering pivot 20" and it abuts against the fixed wall 12" by means of a washer 49.

On FIG. 10, the attachment means 36''' responsible for coupling a tongue 30''' to the piston 13 are formed by a bolt in which the nut forms the first portion 36A' and in which the screw, with a threaded rod 40''' and head 41''', forms the second portion 36B'.

As above, the nut forming the first portion 36A' is capable of being applied, by one of its faces, forming the bearing surface 46''', to the tongue 30''', around the bore 38''' thereof, and, also as above, it is beforehand attached to this tongue 30''', by the adhesion of this bearing surface 46''' thereto, for example by welding or bonding.

As above, finally, the nut forming the first portion 36A' is thus attached to the tongue 30''' independently of the screw, which in this case forms the second portion 36B' of the attachment means 36'''.

Of course, the present invention is not limited to the embodiments described and represented, but includes any variant of performance.

In particular, in FIG. 10, the structures can be inverted, with the screw, with rod 40''' and head 41''', of the bolt used being joined to the tongue by adhesion, its head 41''' being for example fixed by welding or bonding to this tongue 30''', whereas, to come into engagement with the associated bolt, its rod 40''' passes through this tongue 30''' by its bore 37, before passing though the piston 13 by its bore 38'''.

As a variant the attachment means 36 according to the invention may also comprise a tight expansion rivet, of the "POP" type, for example, which is fixed to the tongue, and passes therethrough by its bore, and which, after having passed through the piston by its bore, is then duly expanded, by exerting traction on the shaft or central nail with which it is provided for this purpose.

We claim:

1. A method for the assembly of a locking clutch for a hydrokinetic coupling device having at least one friction lining disposed axially between a fixed wall and a piston and movably mounted axially in relation thereto, for the rotational attachment of the piston to the fixed wall, with tongues substantially extended tangentially at a circumference of the assembly, in which the tongues are coupled to the fixed wall at one of the tongue ends and to the piston at the other of the tongue ends, comprising the steps of coupling the tongues to the piston, passing attachment means having two portions for the tongues through the tongues and the piston, fixing the first portion to the tongues on the side thereof opposite the piston, and clinching the second portion with the first portion, on the other side of the piston.

2. A method according to claim 1, comprising the further steps of coupling the tongues to the fixed wall, and engaging the piston on the first portion of the attachment means borne by the tongues.

3. A method according to claim 2, comprising the further steps of engaging the piston on the first portion of the attachment means borne by the tongues, and centering the piston in relation to the fixed wall.

4. A locking clutch assembly for a hydrokinetic coupling device, comprising at least one friction lining disposed axially between a fixed wall and a piston, the piston is movably mounted axially in relation to the fixed wall and is rotationally connected thereto by tongues substantially extended tangentially at a circumference of the assembly, attachment means for coupling the tongues to the piston, the attachment means generally passing through the tongues and the piston and having a first portion, which acts on the side of the tongues opposite the piston, and a second portion acting on the side of the piston opposite the tongues in clinched engagement with the first portion, wherein the first portion of the attachment means coupling the tongues to the piston is attached to these tongues independently of the second portion.

5. A locking clutch according to claim 4, wherein the tongues have respective bores formed therein, the first portion of the attachment means having a rod, the first portion being fixed to the tongues by the clinched engagement with the rod in the corresponding bore thereof.

6. A locking clutch according to claim 4, wherein the tongues have respective bores formed therein and the first portion of the attachment means comprises a bearing surface for applying the first portion to the tongues around the corresponding bores thereof adhering the tongues to the respective bearing surfaces selected from the group of welding or sticking adherents.

7. A locking clutch according to claim 4, characterized in that the tongues are disposed in the volume which extends radially between the at least one friction lining and the axis of the assembly.

8. A locking clutch according to claim 4, further comprising a part, the tongues coupled to the fixed wall by means of the part, the part being integral with the fixed wall.

9. A locking clutch according to claim 8, wherein the part comprises a washer common to the tongues.

10. A locking clutch according to claim 9, wherein the tongues each comprise a single piece with the washer forming the part for coupling the tongues to the fixed wall.

11. A locking clutch according to claim 4, wherein the fixed wall further comprises a protruding centering pivot, a ring borne on the centering pivot, which is locked axially in relation thereto, and on which the piston is slidingly and tightly mounted.

12. A locking clutch according to claim 4, wherein the fixed wall further comprises a case wall.

13. A locking clutch according to claim 12, wherein the fixed wall further comprises the base wall of a bell-shaped case inside of which the at least one friction lining and the piston extend.

* * * * *